| United States Patent [19] | [11] | 4,255,312 |
|---|---|---|
| Araki et al. | [45] | Mar. 10, 1981 |

[54] AQUEOUS PIGMENT DISPERSION USED FOR AQUEOUS COATING COMPOSITIONS

[75] Inventors: Yoshihiko Araki, Kawasaki; Hajime Hara, Fujisawa; Kazuho Aoyama, Tokyo, all of Japan

[73] Assignee: Nippon Oil Co., Ltd., Tokyo, Japan

[21] Appl. No.: 21,064

[22] Filed: Mar. 16, 1979

[30] Foreign Application Priority Data

Mar. 18, 1978 [JP] Japan .................................. 53-31264
Mar. 30, 1978 [JP] Japan .................................. 53-36979

[51] Int. Cl.$^3$ ............................................... C08L 9/10
[52] U.S. Cl. ......................... 260/29.7 H; 260/29.7 AT
[58] Field of Search .................... 260/29.7 H, 29.7 AT

[56] References Cited

U.S. PATENT DOCUMENTS

| 3,609,110 | 9/1971 | Kumanotani | 260/29.7 H |
|---|---|---|---|
| 3,609,111 | 9/1971 | Kumanotani | 260/29.7 H |
| 3,886,110 | 5/1975 | Go | 260/29.7 H |
| 3,920,769 | 11/1975 | Yaginuma et al. | 260/29.7 H |
| 4,096,106 | 6/1978 | Kita | 260/29.7 H |

*Primary Examiner*—Harry Wong, Jr.
*Attorney, Agent, or Firm*—Ostrolenk, Faber, Gerb & Soffen

[57] ABSTRACT

An aqueous pigment dispersion is obtained by using a reactive dispersing agent for the dispersion of a pigment, and the aforesaid reactive dispersing agent is prepared by neutralizing a homopolymer and/or a copolymer of butadiene having a required amount of an acidic group selected from the group consisting of unsaturated dicarboxylic acids, the anhydrides thereof, and sulfonic acid group, by a water soluble base.

10 Claims, 3 Drawing Figures

AQUEOUS PIGMENT DISPERSION USED FOR AQUEOUS COATING COMPOSITIONS

BACKGROUND OF THE INVENTION

This invention relates to an aqueous pigment dispersion used for aqueous coating compositions.

It is well known that since aqueous paints scarcely require organic solvents, there are no fears of environmental pollution and fire so that such aqueous paints may safely be adopted for household use, and for this reason, the importance of the aqueous paints has recently increased.

However, in spite of the advantages of the aqueous paints as mentioned above, the aqueous paints have not yet replaced organic solvent paints. Of course, this is because the aqueous paints have fatal disadvantages such as poor chemical resistance and poor water resistance. Concerning the causes for these disadvantages, it may be considered that the surface active agent employed for an emulsion polymerization decreases the chemical and water resistance in respect of an emulsion type coating composition, and on the other hand, it may be considered that there is a difficulty for making hydrophilic groups on the water-soluble resin sufficiently hydrophobic in respect of a water soluble coating composition. Under the circumstances, in emulsion type coating compositions, a process of emulsion polymerization in which no surface active agent is employed has been developed so that some effects as to the improvement of water resistance could have been obtained. However, even in this case, use of a usual surface active agent at the step of adding a pigment cannot be avoided, so that the expected improvement as to the properties of the aqueous paints is cancelled.

SUMMARY OF THE INVENTION

It is an object of the present invention to provide an aqueous pigment dispersion which is obtained by using a reactive dispersing agent for the dispersion of pigment, i.e., as a pigment dispersing agent, and the reactive dispersing agent is prepared by neutralizing a homopolymer and/or a copolymer of butadiene having a required amount of an acidic group selected from the group consisting of unsaturated dicarboxylic acids, the anhydrides thereof, and sulfonic acid groups in its molecule by a water soluble base.

The aqueous pigment dispersion according to the present invention is effectively used, as the pigment component, for an aqueous corrosion resisting coating composition having excellent water resistance and chemical resistance.

The reactive dispersing agent prepared by neutralizing a homopolymer and/or a copolymer of butadiene having an unsaturated dicarboxylic acid, the anhydride thereof, or sulfonic acid group by a water soluble base has not only the same or more favourable pigment dispersibility as compared with that of an ordinary non-reactive dispersing agent, but also causes an oxidative cross-linking at room temperature or at baking temperature to provide the tough coating film. In other words, when the reactive dispersing agent according to the present invention is used in an aqueous coating composition, the reactive dispersing agent exhibits the same surface active capability as that of ordinary dispersing agents and furthermore, the reactive dispersing agent has such excellent characteristic feature that the dispersing agent itself can participate in the formation of a coating film through cross linking reaction. On the other hand, an ordinary dispersing agent becomes not only quite useless after the formation of the film, but also deteriorates the resistance against water because of the hydrophobicity thereof.

The present inventive is concerned with an aqueous pigment dispersion used for aqueous coating compositions comprising (1) a polybutadiene derivative; (2) an organic or inorganic pigment; and (3) water; said polybutadiene derivative being prepared by neutralizing a material having 0.05–1.5 mol of an acidic group per 100 grams of a butadiene polymer having a number average molecular weight of 300–10,000 and 50% or more of the butadiene units in the polymer chain being linked in 1, 2 bonds, by a water soluble base in an aqueous solution, said butadiene polymer meaning a butadiene homopolymer or a copolymer having 50% by weight or more of the butadiene units, and said acidic radical group being selected from the group consisting of dicarboxylic acid group, the anhydride group thereof, and sulfonic acid group.

DETAILED DESCRIPTION OF THE INVENTION

Figure 1:
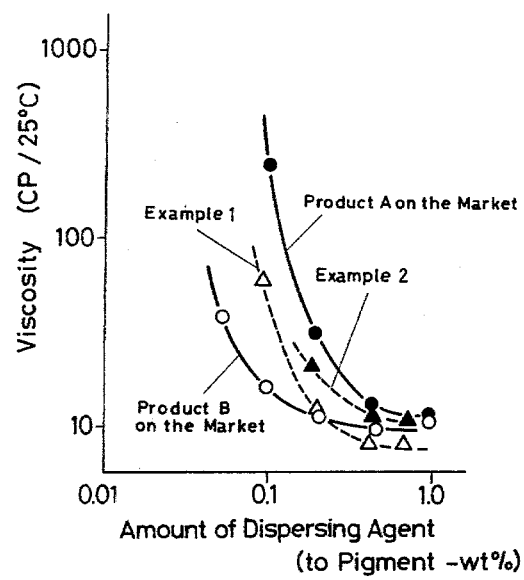
FIG. 1 is a graphical representation showing the relationship between the amount of dispersing agent added according to the present invention or of products commercially available on the market and the decrease of viscosity of the resulting mixtures.

The butadiene polymer according to the present invention is obtained by polymerizing butadiene or copolymerizing butadiene with at least one comonomer being copolymerized with butadiene. The comonomer in this case includes aliphatic conjugated diolefins having 5–12 carbon atoms such as isoprene, and piperylene as well as vinyl aromatic compounds having 8–20 carbon atoms such as styrene, α-methylstyrene, and vinyltoluene, and an amount of the comonomer to be employed is less than 50 mol % with respect to that of butadiene.

The butadiene polymer employed for the present invention has a number average molecular weight of 300–10,000, preferably 300–3,000, and more preferably 500–1,500. Furthermore, this butadiene polymer has 50% or more of the butadiene units in the polymer chain being linked in 1, 2 bonds. When the content of 1, 2 bonds is low, the cross-linking density decreases so that sufficiently satisfactorily physical properties of the coating cannot be obtained. Such butadiene polymer as mentioned above is synthesized by an anionic polymerization in which an alkali metal is usually employed as a component of the catalyst. More specifically, there are proposed some preferable processes for the preparation of the above butadiene polymer such as the following ones. These are the chain transfer polymerization disclosed in U.S. Pat. No. 3,789,090 in which an organic alkali metal compound such as benzyl sodium is used as the catalyst and a compound having alkylaryl group such as toluene is adopted as a chain transfer agent; a living polymerization disclosed in Japanese Patent Publications Nos. 67-17485 and 68-27432, respectively, in which the reaction is carried out by employing a complex consisting of a polycyclic aromatic compound such as naphthalene and sodium as the catalyst in a polar solvent such as tetrahydrofuran; and a process for the polymerization disclosed in Japanese Patent Publications Nos. 57-7446 and 58-1245, respectively, in which an aromatic hydrocarbon such as toluene and xylene is used as the solvent, an alkali metal dispersion such as sodium dispersion is adopted as the catalyst, and an ether such as dioxane is added thereto in order to control the molecular weight of the polymer.

In the aqueous pigment dispersion according to the present invention, 0.05–1.5 mol, preferably 0.2–1.0 mol of an acidic group per 100 grams of the butadiene polymer is introduced to the butadiene polymer. In this case, the acidic group is selected from the group consisting of dicarboxylic acid group, the anhydride group thereof, and sulfonic acid group. Such butadiene polymer containing any acidic group as mentioned above therein may be obtained by the following process.

In the first place, the polymer having the acidic group such as dicarboxylic acid group or the anhydride group thereof is prepared by the addition of an unsaturated, preferably $\alpha,\beta$-ethylenically unsaturated, dicarboxylic acid or the anhydride thereof such as maleic acid, fumaric acid, citraconic acid, itaconic acid, or the anhydrides thereof to the above-mentioned butadiene polymer. That is, the aforesaid polymer may be prepared by adding the aforesaid unsaturated dicarboxylic acid or the anhydride thereof to the butadiene polymer at a temperature of 100°–300° C. in the presence or absence of a solvent.

Furthermore, it is preferable to add a small quantity of phenylenediamines, pyrogallols, naphthols and the like in order to prevent cross-linking in the double bands.

The polybutadiene containing sulfonic acid group may be prepared by such a manner that the aforesaid polybutadiene is reacted with $SO_3$, chlorosulfonic acid, concentrated sulfuric acid or the like.

In general, the sulfonation process of the butadiene polymer is carried out by nearly the same process for the sulfonation of aromatic compounds and olefins. However, it is required to select particularly a mild reaction condition in case of the sulfonation of the butadiene polymer because the butadiene polymer has not only a high reactivity but also is easily accompanied with side reactions such as the polymerization and the like. For instance, it is necessary to adopt $SO_3$. ether complex compound as a reaction reagent, and this $SO_3$. ether complex compound is preferably diluted with a large quantity of a solvent, and the complex thus diluted is gradually dropped into the butadiene polymer diluted also with a large quantity of a solvent. In this case, the reaction temperature is within a range of 20°–50° C., preferably within a range of 0°–30° C., and a high reaction temperature should be avoided because there are accompanied with side reactions.

Halogenated hydrocarbons are suitable for the reaction solvent used in the process according to the present invention, and generally, 1,2-dichloroethane and the like are adopted.

The acid adduct of butadiene polymer thus obtained as mentioned above is then neutralized by a water soluble base such as caustic soda, caustic potash, and ammonia to solubilize the acid adduct of butadiene polymer in water. The condition of the neutralization reaction is not specifically limited. In case of the aforesaid sulfonation, however, it is preferable to add the base immediately after the sulfonation is completed. The neutralizing reaction can be carried out at a temperature of 50°–150° C. for a sufficient period of time so that the sultone ring can be destroyed.

In the case of the neutralization, it is preferable to use the base with an amount being stoichiometrically equivalent to that of the acid, whilst it is desirable to avoid using of an excess of the base because an excess of the base deteriorates the dispersing effects of the dispersing agent or reduces physical properties of the resultant coating.

Although a salt is also produced by the neutralization reaction, the salt is dissociated in this aqueous system.

A pigment is added to the aqueous solution thus obtained, then they are mixed with each other. The polybutadiene derivative in the present invention effectively functions as a dispersing agent in this stage.

The pigments used in the present invention include organic and inorganic pigments for ordinary paints such as titanium white, zinc white, lithopone, white lead, zinc sulfide, barium sulfate, calcium carbonate, carbon black, red oxide, clay, talc, Hansa Yellow, and Phthalocyanine Blue.

The amount of the polybutadiene derivative according to the present invention to be employed varies dependent upon the pigment to be used, but it is generally within a range of 0.1–10% by weight with respect to the amount of the pigment, and preferably within a range of 0.5–5% by weight.

In order to prepare an aqueous pigment dispersion, such a process that the pigment is dispersed in an aqueous solution involving the polybutadiene derivative on a ball mill is preferably adopted. In this case, a small amount of a thickener may be added as necessary.

The amount of water included in the aqueous pigment dispersion according to the present invention thus obtained is generally within a range of 1/10–10 times by weight of that of a pigment, and preferably within a range of 1/6–3 times by weight. If a sufficient dispersion of the pigment can be attained, a lesser amount of water is desirable. In case of using a small amount of water, the dispersion is in a paste form and such paste dispersion may also be used.

The aqueous pigment dispersion so prepared may effectively be employed as a pigment component of an aqueous coating composition through the addition to the aqueous film forming composition.

As the aqueous film forming compositions, there is a water soluble type as well as an emulsion type.

The water soluble type includes aqueous solutions containing drying oil, alkyd resin, amino resins such as melamine resin, and urea resin, phenol resin, acrylic ester resin, or the like and all the above resins include a hydrophilic group such as carboxyl, hydroxyl, ether, amino, and sulfonic acid groups.

On the other hand, the emulsion type film forming composition is prepared by directly emulsifying a resin component or through emulsion polymerization of a resin component. Specific examples of the emulsion type coating composition include polyvinyl acetate emulsion, polyacrylate emulsions such as polybutylacrylate emulsion, styrene-butadiene copolymer emulsion and the like.

The amount of the resin involved in these water soluble type as well as emulsion type film forming compositions is generally within a range of 20-80% by weight, and preferably within a range of 30-70% by weight with respect to the total amount of the coating compositions.

The aqueous pigment dispersion of the present invention may be added and employed with an amount corresponding to usually 1/10-10 times by weight, preferably ⅓-3 times by weight, of the resin component in a water soluble or an emulsion type film forming composition.

The aqueous coating composition prepared by adding the aqueous pigment dispersion according to the present invention as mentioned above provides a coating with a high corrosion resistance.

In case of admixing the aqueous pigment dispersion of this invention with a water soluble or an emulsion type film forming composition, protein, bodying agents, antiseptics, emulsifiers, stabilizers and the like may be added to the mixture, if necessary. On one hand, in order to adjust the solid content and viscosity of the mixture, water may further be added thereto. However, it is, of course, desirable to minimize water soluble materials other than those indispensable to the present invention.

The other compounds which may be added to the coating composition as necessary include a dryer. The polybutadiene derivatives of this invention function as a reactive dispersing agent. Since in the aqueous coating composition involving this polybutadiene derivative there are reactive double bonds in its molecule, there arises oxidative polymerization to cross-link the aqueous coating composition. However, it is observed that oxidative cross-linking velocity is not necessarily sufficient at room temperature. In such a case, about 0.2-5% by weight of a dryer with respect to that of the dispersing agent is generally added to promote the cross linking reaction. Specific examples of such dryers include cobalt or manganese metal dryers usually employed for aqueous paints.

DESCRIPTION OF THE PREFERRED EMBODIMENTS

The following examples are provided to further illustrate the aqueous pigment dispersions of the present invention, but these are not to be regarded as limiting.

EXAMPLES 1 AND 2

Butadiene was polymerized at 35° C. by employing benzyl sodium as the initiator and toluene as the chain transfer agent to obtain two types of liquid polybutadienes having a number average molecular weight of 500 and 1,000 respectively. Maleic anhydride was reacted with each liquid polybutadiene through a usual process to obtain a semisolid maleinized polybutadiene. The resulting maleinized polybutadiene was neutralized by a concentrated caustic soda aqueous solution, a quantity of which is stoichiometrically equivalent to that of the carboxylic acid radical. Typical properties of the raw material polybutadiene as well as the maleinized polybutadiene are indicated in the following Table 1, respectively.

FIG. 1 is a graphical representation showing the relationship between the amount of a dispersing agent added and the decrease of the viscosity of the resulting mixture, when each of the dispersing agents prepared in Examples 1 and 2 was adding to a suspension composed of 100 parts of titanium oxide (R780) and 100 parts of water.

Furthermore, for comparison, sodium salt of $\beta$-naphthalenesulfonic acid-formalin condensate (A) and high molecular weight surfactant containing polycarboxylic acid (B) were selected as commercially available dispersants on the market, and their surface active properties were shown also in FIG. 1. As a consequence, it became clear that the reactive dispersing agents according to the present invention exhibited dispersibility which was not inferior to those of the dispersants available on the market.

TABLE 1

| | Properties of Reactive Dispersing Agent | | | |
|---|---|---|---|---|
| | Raw Material Butadiene Polymer | | | |
| Example | Number Average Molecular Weight | 1, 2 Bonds(%) | Amount of Maleic Anhydride Added mol/100 g Polybutadiene | Degree of Neutralization |
| 1 | 630 | 53 | 0.8 | 1.0 |
| 2 | 1100 | 59 | 1.0 | 1.0 |

EXAMPLES 3, 4, and 5 as well as REFERENCE EXAMPLES 1 and 2

According to the composition shown in the following Table 2, 30% of aqueous solution of each dispersing agent in Examples 1 and 2 as well as Reference examples 1 and 2, and 3% methyl cellulose aqueous solution were mixed with pigments on a ball mill for 5 hours to obtain each aqueous pigment dispersion. Further, an acrylic resin emulsion (50% by weight of the resin content) or a vinyl acetate emulsion (50% by weight of the resin content), and an additive were added to the resulting aqueous pigment dispersion, and the mixture thus obtained was agitated on the ball mill for 1 hour to obtain an aqueous corrosion resistant coating composition.

TABLE 2

| | Composition of Coating | | | | |
|---|---|---|---|---|---|
| Type of Dispersing Agent | Reference Example 1 Product A on Market | Example 3 Dispersing Agent of Example 1 | Example 4 Dispersing Agent of Example 2 | Reference Example 2 Product A on Market | Example 5 Dispersing Agent of Example 2 |
| Aqueous Coating Dispersion | 52.9 | 52.8 | 52.8 | 47.0 | 47.0 |
| Titanium Oxide (Rutile) | 20.0 | 20.0 | 20.0 | 20.0 | 20.0 |
| Calcium Carbonate | 20.0 | 20.0 | 20.0 | 15.0 | 15.0 |
| 30% Solution of Dispersing Agent | 1.3 | 2.6 | 2.6 | 1.5 | 13.5 |
| 3% Methyl Cellulose | 5.0 | 5.0 | 5.0 | 5.0 | 5.0 |
| Water | 6.6 | 5.2 | 5.2 | 5.5 | 3.5 |

TABLE 2-continued

| Type of Dispersing Agent | Composition of Coating | | | | |
|---|---|---|---|---|---|
| | Reference Example 1 Product A on Market | Example 3 Dispersing Agent of Example 1 | Example 4 Dispersing Agent of Example 2 | Reference Example 2 Product A on Market | Example 5 Dispersing Agent of Example 2 |
| Acrylic Resin Emulsion | 45.0 | 45.0 | 45.0 | 0.0 | 0.0 |
| Vinyl Acetate Resin Emulsion | 0.0 | 0.0 | 0.0 | 40.0 | 40.0 |
| Additive and The Others | 2.1 | 2.2 | 2.2 | 13.0 | 13.0 |
| Dryer (Cobalt Naphthenate - 5%) | 0.0 | 0.1 | 0.1 | 0.0 | 0.1 |
| Water | 2.0 | 2.0 | 2.0 | 13.0 | 12.9 |
| Ammonia Water | 0.1 | 0.1 | 0.1 | 0.0 | 0.0 |

Each of the resulting coating composition was coated on a dull steel plate having a dimension of 70×150×0.8 mm to obtain a film thickness of about 30μ in the dried state, the so coated film was then dried at room temperature for 7 days, and the resulting coated film was subjected to various corrosion resistant tests. The results obtained were indicated in the following Table 3.

TABLE 3

| | Corrosion Resistant Test | | | | |
|---|---|---|---|---|---|
| | Reference Example 1 | Example 3 | Example 4 | Reference Example 2 | Example 5 |
| Water Resistance (20° C., 5 days) | Δ | o | o | x | o |
| Brine Resistance (3% Brine, 20° C. 5 days) | x | o | o | x | o |
| Salt Spraying Resistance (24 hours) | x | Δ | o | x | Δ |

From Table 3, it is obvious that the corrosion resistance of the resulting coating can be improved by using the reactive dispersing agents according to the present invention. In Table 3, a symbol o means an excellent result, Δ a favourable result, and x a poor result, respectively.

EXAMPLE 6

Experiment 1:

In this experiment, the synthesis of sulfonated polybutadiene, which was obtained by adding sulfonic acid radical to 50% of double bonds of a butadiene polymer having a molecular weight of 1000, will be described hereinbelow.

$SO_3$-dioxane (1:1) complex was synthesized from 67.2grams of $SO_3$ dissolved into dehydrated dichloroethane and 73.9 grams of dehydrated dioxane dissolved into dichloroethane.

100 grams of a butadiene polymer having a number average molecular weight of 1000, a viscosity of 12 poise at 25° C. and containing 59% of vinyl group, 17% of trans group, and 16% of cis group in its micro-structure was placed in a separable flask having a capacity of 2 liter, and the butadiene polymer was dissolved into 1200 cc of dehydrated dichloroethane. Then, a dichloroethane solution of the aforesaid $SO_3$-dioxane (1:1) complex was dropped to the above resulting solution under nitrogen stream for 60 minutes while cooling the mixture at a temperature of 10°–15° C. After finishing the dropping, the reaction mixture was maintained at the same temperature for 30 minutes.

The 30% aqueous solution containing 37 grams of caustic soda was cooled with ice and the above reaction mixture was poured into the caustic solution with vigorous agitating. After completing the addition, the resulting mixture was heated at 60° C. for 30 minutes to finish the hydrolysis.

When the solvent was distilled off, 167 grams of a yellow or brown semisolid product was obtained, and the resulting product was dissolved into water to prepare 30% aqueous solution thereof.

Experiment 2:

In this experiment, the synthesis of sulfonated polybutadiene, which was obtained by adding sulfonic acid radical to 30% of double bonds of a butadiene polymer having a molecular weight of 1000, will be described hereinbelow.

According to the same procedure as in Experiment 1, 40.3 grams of $SO_3$ were reacted with 100 grams of the butadiene polymer having a number average molecular weight of 1000. After finishing the reaction, the reaction liquid was neutralized by a caustic soda aqueous solution, and then the solvent was distilled off, 138 grams of a yellow greasy product were obtained. The resulting product was then dissolved into water to prepare 30% aqueous solution thereof.

Experiment 3:

In this experiment, the synthesis of sulfonated polybutadiene, which was obtained by adding sulfonic acid radical to 50% of double bonds of a butadiene polymer having a molecular weight of 630, will be described hereinbelow.

According to the same procedure as in Experiment 1, 64 grams of $SO_3$ were reacted with 100 grams of a butadiene polymer having a number average molecular weight of 630, a viscosity of 4 poise at 25° C. and containing 53% of vinyl group, 17% of trans group, and 17% of cis group in its micro-structure. After completing the reaction, the reaction mixture was neutralized by a caustic soda aqueous solution, and when the solvent was distilled off, a brown semisolid product was obtained. The resulting product was then dissolved into water to prepare 30% aqueous solution thereof.

Figure 2:
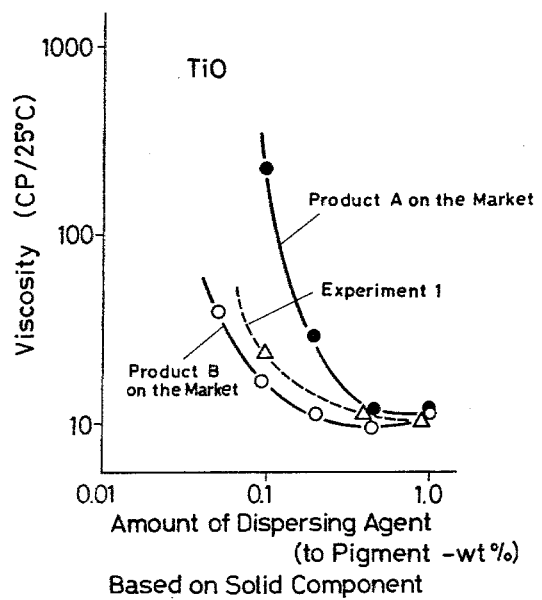
FIG. 2 is a graphical representation showing the relationship between the amount of dispersing agents added to the products on the market as well as of another dispersing agent according to the present invention and the decrease of viscosity of the resulting mixtures.

FIG. 2 is a graphical representation showing the relationship between the amount of a dispersing agent added and the decrease of the viscosity of the resulting mixture when the dispersing agent prepared in Experiment 1 was adding to the suspension composed of 100 parts of titanium oxide (R780) and 100 parts of water. Furthermore, for comparison, sodium salt of β-naphthalenesulfonic acid-formalin condensate (A) and high molecular weight surfactant containing polycarboxylic acid (B) were selected as commercially available dispersants on the market, and their surface active properties were shown also in FIG. 2. As a result, it became clear that the reactive dispersing agent according to the present invention exhibited dispersibility which was not inferior to those of the dispersants on the market.

EXAMPLE 7

Figure 3:
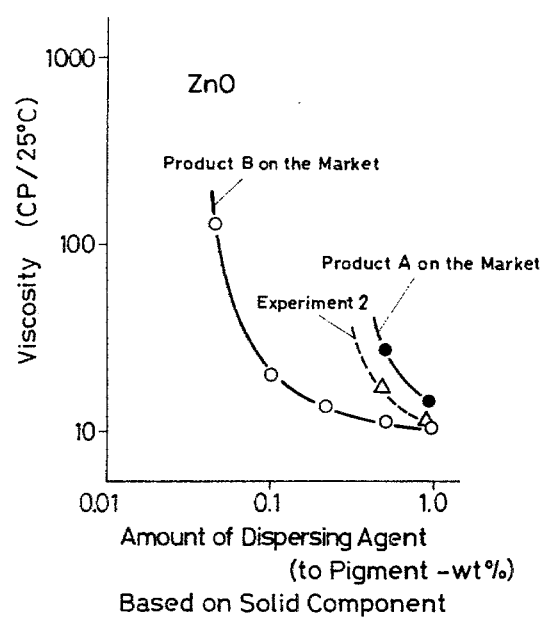
FIG. 3 is a graphical representation showing the relationship between the amount of dispersing agents added of the products on the market as well as of still another dispersing agent according to the present invention and the decrease of viscosity of the resulting mixtures.

FIG. 3 is a graphical representation showing the relationship between the amount of a dispersing agent added and the decrease of the viscosity of the resulting mixture when the dispersing agent obtained in Experiment 3 was adding to the suspension composed of 100 parts of zinc white and 100 parts of water. For the comparison, sodium salt of β-naphthalenesulfonic acid-formation condensate (A) and high molecular weight surfactant containing polycarboxylic acid (B) were selected as products available on the market, and their surface active properties were shown also in FIG. 3. As a consequence, it became clear that the reactive dispersing agent according to the present invention exhibited dispersibility which was not inferior to those of the products on the market.

EXAMPLES 8, 9 and 10 as well as REFERENCE EXAMPLE

According to the composition shown in the following Table 4, 30% of aqueous solution of each dispersing agent in Example 6 as well as Experiments 1, 2 and 3, and 3% methyl cellulose aqueous solution were mixed with pigments on ball mill for 5 hours to obtain each aqueous pigment dispersion. Furthermore, an acrylic emulsion (50% by weight of the resin content) and an additive were added to the resulting aqueous pigment dispersion, and the mixture thus obtained was agitated on ball mill for 1 hour to obtain an emulsion coating.

TABLE 4

| | Composition of Coating | | | |
|---|---|---|---|---|
| Type of Dispersing Agent | Reference Example Product A on Market | Example 8 Dispersing Agent of Experiment 1 | Example 9 Dispersing Agent of Experiment 2 | Example 10 Dispersing Agent of Experiment 3 |
| Aqueous Coating Dispersion | 52.9 | 52.8 | 52.8 | 52.8 |
| Titanium Oxide (Rutile) | 20.0 | 20.0 | 20.0 | 20.0 |
| Calcium Carbonate | 20.0 | 20.0 | 20.0 | 20.0 |
| 30% Solution of Dispersing Agent | 1.3 | 2.6 | 2.6 | 2.6 |
| 3% Methyl Cellulose | 5.0 | 5.0 | 5.0 | 5.0 |
| Water | 6.6 | 5.2 | 5.2 | 5.2 |
| Acrylic Resin Emulsion | 45.0 | 45.0 | 45.0 | 45.0 |
| Additive and The Others | 2.1 | 2.2 | 2.2 | 2.2 |
| Dryer (Cobalt Naphthenate - 5%) | 0.0 | 0.1 | 0.1 | 0.1 |
| Water | 2.0 | 2.0 | 2.0 | 2.0 |
| Ammonia Water | 0.1 | 0.1 | 0.1 | 0.1 |

Each of the resulting coating was coated on a dull steel plate having a dimension of 70×150×0.8 mm to obtain a film thickness of about 30μ in the dried state, the so coated film was then dried at room temperature for 7 days, and the resulting coated film was subjected to various corrosion resistant tests. The results obtained were indicated in the following Table 5.

TABLE 5

| | Corrosion Resistant Test | | | |
|---|---|---|---|---|
| | Reference Example | Example 8 | Example 9 | Example 10 |
| Water Resistance (20° C., 5 days) | Δ | o | o | o |
| Brine Resistance (30% Brine, 20° C., 5 days) | x | o | o | o |

TABLE 5-continued

| | Corrosion Resistant Test | | | |
|---|---|---|---|---|
| | Reference Example | Example 8 | Example 9 | Example 10 |
| Salt Spraying Resistance (24 hours) | x | Δ | o | Δ |

Note:
o: Excellent
Δ: Favourable
x: Poor

From Table 5, it is obvious that the corrosion resistance as well as the water resistance of the resulting coating can be improved by using the reactive dispersing agents according to the present invention.

What is claimed is:

1. An aqueous pigment dispersion for use in aqueous coating compositions comprising:
   (1) an organic or inorganic pigment;
   (2) an amount of water within a range of 1/10–10 times by weight of said pigment; and
   (3) an amount of a reactive dispersing agent within the range of 0.1–10% by weight of said pigment wherein said reactive dispersing agent consists essentially of a water-soluble base neutralized polymer prepared by acidifying the polymerized butadiene units of a polymer of butadiene having more than 50 mole percent butadiene units of which at least 50% are linked in 1,2 bonds and having a number average molecular weight for 300–10,000, with an acid compound selected from the group consisting of unsaturated dicarboxylic acid or anhydride thereof, SO₃, chlorosulfonic acid and sulfuric acid, said butadiene polymer having been acidified to have 0.05–1.5 moles of acid per 100 grams thereof and base neutralizing the acidified butadiene polymer.

2. The aqueous pigment dispersion of claim 1, wherein said number average molecular weight is 300–3000 and the amount of said acidic group is 0.2–1.2 moles per 100 grams.

3. The aqueous pigment dispersion of claim 2, wherein said molecular weight is 500–1500.

4. The aqueous pigment dispersion of claim 1, wherein the water is present in an amount of 1/6–3 times by weight of said pigment and said reactive dispersing agent is present in an amount of 0.5–5% of said pigment.

5. The aqueous pigment dispersion of claim 1, wherein said polymer of butadiene is a butadiene homopolymer.

6. The aqueous pigment dispersion of claim 1, wherein said polymer of butadiene is a copolymer of butadiene with a copolymerizable 5-12 carbon atom conjugated aliphatic diolefin or 8-20 carbon atom vinyl aromatic compound.

7. The aqueous pigment dispersion of claim 1, wherein said reactive dispersing agent is a water-soluble neutralized maleinized polybutadiene.

8. The aqueous pigment dispersion of claim 1, wherein said reactive dispersing agent is a water-soluble base neutralized sulfonated polybutadiene.

9. An aqueous coating composition comprising an aqueous resin and 1/10–10 times by weight of the resin of the aqueous pigment dispersion of claim 1.

10. An aqueous coating composition comprising an aqueous resin and ⅓–3 times by weight of the resin of the aqueous pigment dispersion of claim 1.

* * * * *